(12) United States Patent
Nanjappan et al.

(10) Patent No.: US 10,217,345 B1
(45) Date of Patent: Feb. 26, 2019

(54) SAFETY HEADWEAR STATUS DETECTION SYSTEM

(71) Applicant: Otis Elevator Company, Farmington, CT (US)

(72) Inventors: Ezhil Nanjappan, Farmington, CT (US); Tony Black, Hobe Sound, FL (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/691,376

(22) Filed: Aug. 30, 2017

(51) Int. Cl.
*G08B 21/18* (2006.01)
*H04W 4/02* (2018.01)
*H04W 4/80* (2018.01)

(52) U.S. Cl.
CPC ............ *G08B 21/18* (2013.01); *H04W 4/027* (2013.01); *H04W 4/80* (2018.02)

(58) Field of Classification Search
CPC ......... H04W 4/027; H04W 4/80; G08B 21/18
See application file for complete search history.

(56) References Cited

U.S. PATENT DOCUMENTS

| | | | |
|---|---|---|---|
| 6,798,392 B2 | 9/2004 | Hartwell et al. | |
| 7,298,258 B1 | 11/2007 | Hudgens et al. | |
| 7,932,820 B2 | 4/2011 | Hurwitz | |
| 8,157,402 B2 | 4/2012 | Huss et al. | |
| 9,247,779 B1 | 2/2016 | Aloumanis et al. | |
| 9,427,039 B2 | 8/2016 | Eustace | |
| 9,445,639 B1 | 9/2016 | Aloumanis et al. | |
| 9,652,626 B2 | 5/2017 | Son et al. | |
| 2012/0075096 A1* | 3/2012 | Howard | G08B 13/1427 340/539.12 |
| 2012/0210498 A1 | 8/2012 | Mack | |
| 2014/0208487 A1 | 7/2014 | Orientale et al. | |
| 2016/0066640 A1 | 3/2016 | Weller et al. | |
| 2016/0073722 A1* | 3/2016 | Eustace | A42B 3/0466 340/539.13 |
| 2016/0110615 A1 | 4/2016 | Weller et al. | |

(Continued)

FOREIGN PATENT DOCUMENTS

| | | |
|---|---|---|
| CN | 104621833 A | 5/2015 |
| CN | 204426844 U | 7/2015 |

(Continued)

OTHER PUBLICATIONS

Fang, Yi-Chong et al., "A Smartphone-Based Detection of Fall Portents for Construction Workers", Procedia Engineering 85 (2014) p. 147-156.

(Continued)

*Primary Examiner* — Leon Flores
(74) *Attorney, Agent, or Firm* — Cantor Colburn LLP

(57) ABSTRACT

A safety headwear monitoring system is provided. The safety headwear monitoring system comprising: a sensor configured to detect a status parameter, wherein the status parameter indicates whether an object is located within a selected distance of the sensor; a transmission device in electronic communication with the sensor and configured to receive the status parameter from the sensor; and an application installed on a user device in wireless communication with the transmission device; wherein the transmission device is configured to transmit the status parameter to the application.

16 Claims, 3 Drawing Sheets

(56) References Cited

U.S. PATENT DOCUMENTS

| | | |
|---|---|---|
| 2016/0210933 A1 | 7/2016 | Liang |
| 2016/0309827 A1 | 10/2016 | Dodson |
| 2017/0119078 A1 | 5/2017 | Chen et al. |
| 2017/0215512 A1 | 8/2017 | Zhang |
| 2017/0221345 A1 | 8/2017 | Chen |
| 2017/0223168 A1 | 8/2017 | Singh et al. |

FOREIGN PATENT DOCUMENTS

| | | |
|---|---|---|
| CN | 205106505 U | 3/2016 |
| CN | 105581411 A | 5/2016 |
| CN | 105725334 A | 7/2016 |
| CN | 206227784 U | 6/2017 |
| CN | 206314643 U | 7/2017 |
| WO | 2017051371 A1 | 3/2017 |

OTHER PUBLICATIONS

Laing O'Rourke, "Smart hats monitor health", available at: http://www.infoworks.laingorourke.com/innovation/2015/smart-hats-monitor-health.aspx, accessed Aug. 30, 2017, 3pgs.

McCoy, Sean, "Smart' Hat, Helmet Monitor Heart Rate" available at: https://gearjunkie.com/lifebeam-hat-helmet-heart-rate-monitor, Sep. 25, 2014, 9pgs.

Virginia Tech "Equipping a construction helmet with a sensor can detect the onset of carbon monoxide poisoning", available at: https://www.sciencedaily.com/releases/2013/08/130817205511.htm, Aug. 17, 2013, 6pgs.

\* cited by examiner

SAFETY HEADWEAR STATUS DETECTION SYSTEM

BACKGROUND

The subject matter disclosed herein generally relates to the field of safety headwear, and more particularly to an apparatus and method for determining the status of the safety headwear.

Safety headwear, such as helmets and hard hats, serve an important purpose but can only provide protection if they are properly used.

BRIEF SUMMARY

According to one embodiment, a safety headwear monitoring system is provided. The safety headwear monitoring system comprising: a sensor configured to detect a status parameter, wherein the status parameter indicates whether an object is located within a selected distance of the sensor; a transmission device in electronic communication with the sensor and configured to receive the status parameter from the sensor; and an application installed on a user device in wireless communication with the transmission device; wherein the transmission device is configured to transmit the status parameter to the application.

In addition to one or more of the features described above, or as an alternative, further embodiments may include: a headwear body, wherein the sensor and the transmission device are operably attached to the headwear body.

In addition to one or more of the features described above, or as an alternative, further embodiments may include: a status indicator configured to activate when the status parameter indicates that an object is within a selected distance of the sensor.

In addition to one or more of the features described above, or as an alternative, further embodiments may include that the wireless communication is Bluetooth.

In addition to one or more of the features described above, or as an alternative, further embodiments may include that the sensor is a capacitance sensor.

In addition to one or more of the features described above, or as an alternative, further embodiments may include that the application on the user device is configured to transmit the status parameter to an application on a manager device.

In addition to one or more of the features described above, or as an alternative, further embodiments may include that the application on the user device is configured to detect a speed parameter of the user device.

In addition to one or more of the features described above, or as an alternative, further embodiments may include that the application on the user device is configured to detect a location parameter of the user device.

In addition to one or more of the features described above, or as an alternative, further embodiments may include that the application on the user device is configured to transmit the status parameter to an application installed on a manager device when the location parameter is within a selected radius of a selected location.

In addition to one or more of the features described above, or as an alternative, further embodiments may include that the application on the user device is configured to detect a speed parameter of the user device when the location parameter indicates that the user device is en route to a selected location.

In addition to one or more of the features described above, or as an alternative, further embodiments may include that the application on the user device is configured to transmit the status parameter to an application installed on a manager device when the status parameter indicates that an object is not within a selected distance of the sensor and when the location parameter is within a selected radius of a selected location.

In addition to one or more of the features described above, or as an alternative, further embodiments may include that the application on the user device is configured to transmit the speed parameter to an application installed on a manager device when the speed parameter is above a selected speed.

In addition to one or more of the features described above, or as an alternative, further embodiments may include that the application on the user device is configured to transmit the speed parameter to an application installed on a manager device when the speed parameter is above a selected speed.

In addition to one or more of the features described above, or as an alternative, further embodiments may include that the application on the user device is configured to transmit the status parameter to an application installed on a manager device when the status parameter indicates that an object is not within a selected distance of the sensor and when the location parameter indicates that the user device is en route to a selected location.

In addition to one or more of the features described above, or as an alternative, further embodiments may include: a warning light in electronic communication with the transmission device, the warning light being located within a line of sight of a wearer of the safety headwear, wherein the warning light is configured to activate when the speed parameter is above a selected speed.

In addition to one or more of the features described above, or as an alternative, further embodiments may include: a warning light in electronic communication with the transmission device, the warning light being located within a line of sight of a wearer of the safety headwear, wherein the warning light is configured to activate when a message is received from the manager device.

According to another embodiment, a method of monitoring safety headwear usage is provided. The method comprising: detecting, using a sensor, a status parameter, wherein the status parameter indicates whether an objection is located within a selected distance of the sensor; receiving, using a transmission device, the status parameter from the sensor, the transmission device being in electronic communication with the sensor; and transmitting, using the transmission device, the status parameter to an application installed on a user device in wireless communication with the transmission device.

In addition to one or more of the features described above, or as an alternative, further embodiments may include: transmitting, using the application installed on the user device, the status parameter to an application installed on a manager device.

In addition to one or more of the features described above, or as an alternative, further embodiments may include: detecting, using the application installed on the user device, a location parameter of the user device; and transmitting, using the application installed on the user device, the location parameter of the user device to an application installed on a manager device.

In addition to one or more of the features described above, or as an alternative, further embodiments may include: detecting, using the application installed on the user device, a speed parameter of the user device; and transmitting, using the application installed on the user device, the speed parameter of the user device to an application installed on a manager device.

Technical effects of embodiments of the present disclosure include monitoring a status parameter of a safety headwear and transmitting the status parameter through a user device in short-range wireless connection with the safety headwear.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
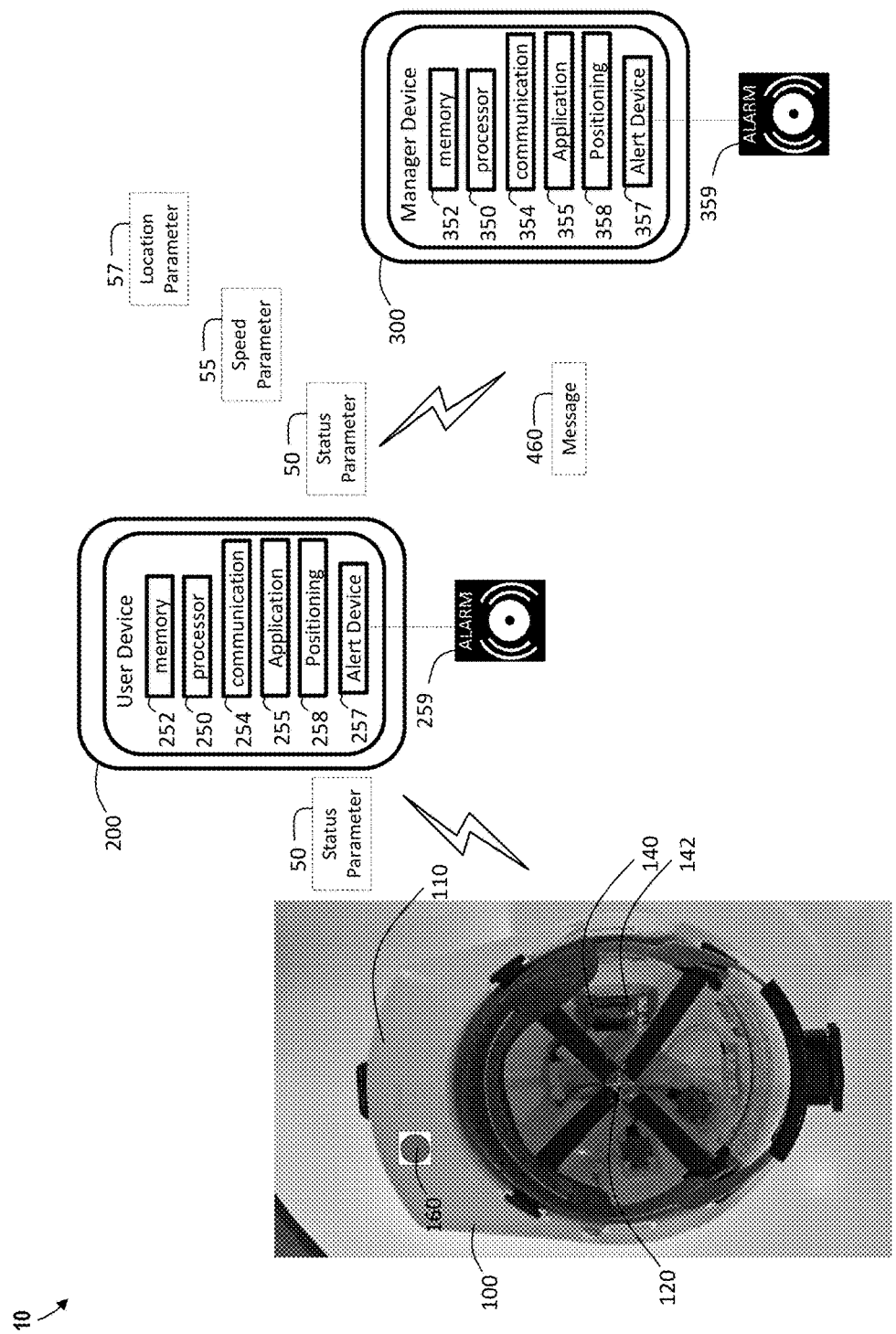
FIG. 1 illustrates a schematic view of a safety headwear monitoring system, in accordance with an embodiment of the disclosure.

FIG. 1 depicts a safety headwear monitoring system 10 in an example embodiment. The safety headwear monitoring system 10 includes one or more safety headwear 100, a user device 200, and a manager device 300. The user device 200 is capable of secure bi-directional communication with the safety headwear 100 and the manager device 300. The communication may occur over a wireless network, such as 802.11x (Wi-Fi), short-range radio, cellular, satellite, etc. The user device 200 may be a mobile computing device that is typically carried by a person, such as, for example a phone, PDA, smart watch, tablet, laptop, etc. The user device 200 may include a processor 250, memory 252 and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the user device 200 including executable instructions stored therein, for instance, as firmware. The communication module 254 may implement one or more communication protocols as described in further detail herein. The user device 200 may also include a positioning system 258 configured to determine a location of the user device 200. The positioning system 258 may include but is not limited to a GPS system, a wireless signal triangulation system, and/or a cellular signal triangulation system. The position system 258 may be configured to determine a location parameter 57 of at least one of the user device 200 and the safety headwear 100. Utilizing one or more location parameters 57 a speed parameter 57 may be determined. The user device 200 may include an alert device 257 configured to activate an alarm 259. In three non-limiting examples, the alert device 257 may be a vibration motor, audio speaker, and/or display screen. The alarm 259 may be audible, visual, haptic, and/or vibratory. The user device 200 may also include an application 255. Embodiments disclosed herein, may operate through the application 255 installed on the user device 200, discussed further below. In a non-limiting example, the user device 200 may belong to an employee of a company.

The manager device 300 is capable of secure bi-directional communication with the user device 200. The communication may occur over a wireless network, such as 802.11x (Wi-Fi), short-range radio, cellular, satellite, etc. The manager device 300 may be a computing device such as a desktop computer. The manager device 300 may also be a mobile computing device that is typically carried by a person, such as, for example a phone, PDA, smart watch, tablet, laptop, etc. The manager device 300 may also be two separate devices that are synced together such as, for example, a cellular phone and a desktop computer synced over an internet connection. The manager device 300 may include a processor 350, memory 352 and communication module 354 as shown in FIG. 1. The processor 350 can be any type or combination of computer processors, such as a microprocessor, microcontroller, digital signal processor, application specific integrated circuit, programmable logic device, and/or field programmable gate array. The memory 352 is an example of a non-transitory computer readable storage medium tangibly embodied in the manager device 300 including executable instructions stored therein, for instance, as firmware. The communication module 354 may implement one or more communication protocols as described in further detail herein. The manager device 300 may also include a positioning system 358 configured to determine a location of the manager device 300. The positioning system 358 may include but is not limited to a GPS system, a wireless signal triangulation system, and/or a cellular signal triangulation system. The manager device 300 may include an alert device 357 configured to activate an alarm 359. In three non-limiting examples, the alert device 357 may be a vibration motor, audio speaker, and/or display screen. The alarm 359 may be audible, visual, haptic, and/or vibratory. The manager device 300 may also include an application 255. Embodiments disclosed herein, may operate through the application 255 installed on the manager device 300, discussed further below. In a non-limiting example, the manager device 300 may belong to a manager or supervisor of the employee carrying the user device 200.

The safety headwear 100 may be a construction hard hat, bicycle helmet, motorcycle helmet, racecar helmet, sports helmet, or similar head protection device known to one of skill in the art. The safety headwear 100 includes a headwear body 110 configured to protect a head of a person wearing the safety headwear 100. The headwear body 110 may be composed of a hard outer shell and/or energy absorption material. The safety headwear 100 also includes a sensor 120 configured to detect a status parameter 50 of the safety headwear 100. The status parameter 50 may indicate whether or not a person is wearing the helmet. The sensor 120 detects when an object is within a selected distance, thus the proximately sensor 120 may be located such that when the safety headwear 100 is being worn the sensor 120 is within the select distance of the wearer's head. In an embodiment, the sensor 120 may be a capacitance sensor. The safety headwear 100 may include a status indicator 142 configured to activate when the status parameters 50 indicates that an object is within a selected distance of the sensor 120. The status indicator 142 is in electronic communication with the sensor 120. The status indicator 142 may be a light, such as a light emitting diode (LED), which illuminates when the 120 detects that a person is wearing the safety headwear 100 or not wearing the safety headwear 100. For example, the status indicator 142 may illuminate green when a head is detected and red when a head is not detected.

The safety headwear 100 also includes a transmission device 140 in electronic communication with the sensor 120 and in wireless communication with the user device 200. The wireless communication may be short-range wireless communication such as for example 802.11x (Wi-Fi), short-range radio, Bluetooth, and/or any other type of short range communication known to one of skill in the art. In an embodiment the short-range wireless communication is Bluetooth. The sensor 120 and the transmission device 140 are operably attached to the headwear body 110. The transmission device 140 is configured to transmit a status parameter 50 detected by the sensor 120 to the user device 200. The transmission device 140 may be configured to transmit the status parameter 50 periodically at a selected frequency or when the status parameter 50 changes. The transmission device 140 may also include a power device (not shown) configured to provide power to the transmission device 140. In embodiment the transmission device 140 is a low energy device configured to reduce consumption of energy from the power device. The safety headwear 100 may also include a warning light 160 in electronic communication with the transmission device 140. The warning light 160 may be located such that the warning light 160 is within a line of sight of a wearer of the safety headwear 100. The warning light 160 is configured to activate when a speed parameter 55 indicates they are driving above a selected speed, such as the local speed limit. The warning light 160 is also configured to activate when a message 460 (see FIG. 2) is received from the manager device 300. Activation of the warning light 160 may include illuminating the warning light 160 and/or changing a color of the warning light 160. The warning light 160 may illuminate and/or strobe a specific color to catch the attention of the wearer of the safety headwear 100. In a non-limiting example, the warning light 160 may illuminate and/or strobe the color red.

When a status parameter 50 is received by the user device 200, the status parameter 50 may then be transmitted to the manager device 300. The status parameter 50 may be displayed on the user device 200 when received from the transmission device 140. The alarm 259 may be activated on the user device 200 when the status parameter 50 is received and the status parameter 50 indicates that the safety headwear 100 is not being worn. Further, the status parameter 50 may be displayed on the manager device 300 when received from the user device 200. The alarm 359 may be activated on the manager device 300 when the status parameter 50 is received and the status parameter 50 indicates that the safety headwear 100 is not being worn.

Figure 2:
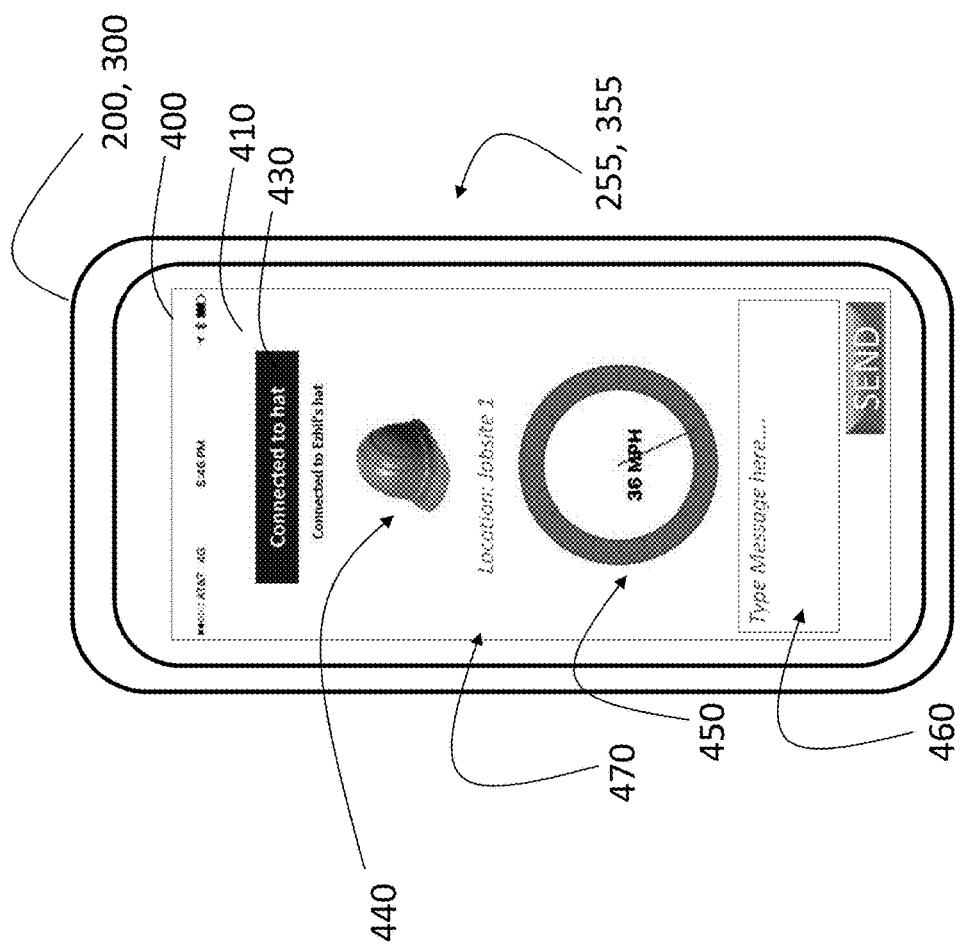
FIG. 2 depicts a user interface on a device, in accordance with an embodiment of the disclosure.

Referring now to FIG. 2 with continued reference to FIG. 1. FIG. 2 depicts an example user interface 400 on either the user device 200 or the manager device 300 through the respective application 255, 355. It is understood that the application 255 on the user device 200 may be the same application 355 that is installed on the manager device 300, thus the two applications 255, 355 may share a common user interface 400 illustrated in FIG. 2. In one embodiment, the application 255 on the user device 200 may be different from the application 355 that is installed on the manager device 300. When using the application 255, 355 the user interface 400 may display a status screen 410, as shown in FIG. 2. The status screen 410 may display a connection status 430, a safety headwear status 440, a speed status 450, and a location status 470. The connection status 430 depicts whether the user device 200 is connected to the transmission device 140 of the safety headwear 100.

The safety headwear status 440 depicts the status parameter 50 detected by the sensor 120. For example, a manager may want to know if their employee is wearing the safety headwear 100 at the jobsite, thus a status parameter 50 may be transmitted from the user device 200 to the manager device 300 and viewed on the manager device 300 via safety headwear status 440. In another example, if the sensor 120 detects that a person is wearing their safety headwear 100 then the safety status 440 may illuminate a green symbol, which is a hard hat in FIG. 2. However, if the sensor 120 detects that a person is not wearing their safety headwear 100 then the safety status 440 may illuminate a red or a faded gray. The manager may type and transmit a message 460 using the manager device 300 to the user device 200 in response to the status parameter 50. For example, after the viewing the status parameter 50, the manager may transmit a message 460 to the employee indicating that the employee should put on their helmet. In two non-limiting examples, the message 460 may be either a text message or an email message.

The speed status 450 depicts a speed parameter 55 of the user device 200 and/or safety headwear 100. For example, a manager may want to know how fast their employee is riding their scooter to a jobsite to ensure safe arrival, thus a speed parameter 55 may be transmitted from the user device 200 to the manager device 300 and viewed on the manager device 300 via the speed status 450. The manager may type and transmit a message 460 using the manager device 300 to the user device 200 in response to the speed parameter 55. For example, after the viewing the speed parameter 55, the manager may transmit a message 460 to the employee indicating that the employee should slow down. In two non-limiting examples, the message 460 may be either a text message or an email message. Further, the warning light 160 in the field of vision of a wearer of the safety headwear 100 may activate so that the wearer (ex: employee) may be alerted of the message 460 from their manager 460 and/or that a speed parameter 55 indicates they are driving above a selected speed, such as the local speed limit. Alternatively, the alarm 259 may activate an audible and/or vibratory alarm 259 so that the employee may be alerted of the message 460 from their manager 460 and/or that a speed parameter 55 indicates they are driving above a selected speed. Advantageously, by alerting the employee through the warning light 160, an audible alarm 259, and/or a vibratory alarm 259 it helps the employee maintain eye contact on the road while driving.

The location status 470 depicts a location parameter 57 of the user device 200 and/or safety headwear 100. In an example, the location status 470 may state the jobsite where the user device 200 and/or safety headwear 100 is located. In another example, the location status 470 may state that the employee is "en route" to a jobsite. In yet another example, the location status 470 may state the geographical location of the use device and/or safety headwear 100. For example, a manager may want to know where their employee is to know whether they are at a jobsite where safety headwear 100 must be worn or the if employee is riding their scooter to a jobsite and a safe speed must be maintained while wearing headwear 100 en route to the jobsite, thus a location parameter 57 may be transmitted from the user device 200 to the manager device 300 and viewed on the manager device 300 via the location status 470. The manager may type and transmit a message 460 using the manager device 300 to the user device 200 in response to the location parameter 57. For example, after the viewing the location parameter 57 in conjunction with the status parameter 50, the manager may transmit a message 57 to the employee indicating that the employee put on their safety headwear 100 while at the jobsite. In two non-limiting examples, the message 460 may be either a text message or an email message.

Figure 3:
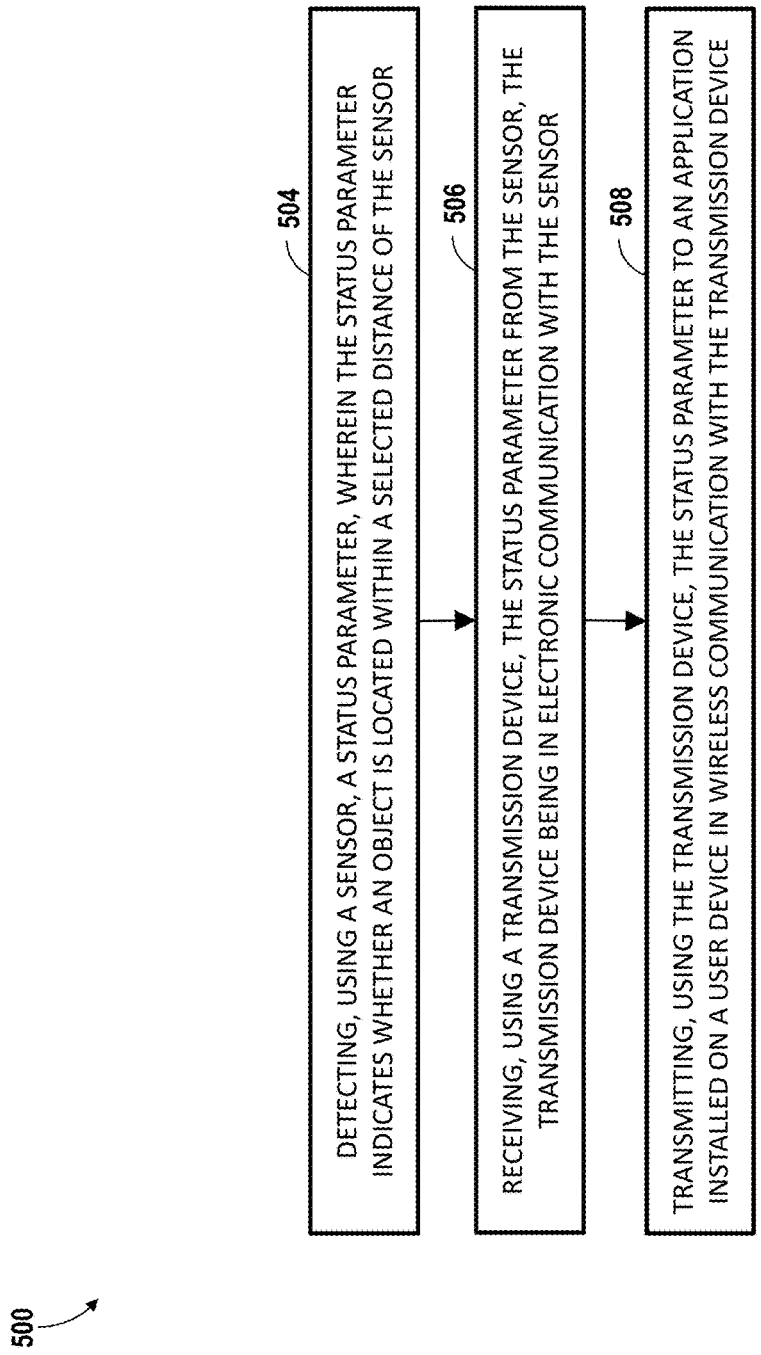
FIG. 3 is a flow diagram illustrating a method of monitoring safety headwear usage, according to an embodiment of the present disclosure.

Referring now to FIG. 3, while referencing components of FIG. 1. FIG. 3 shows a flow chart of method 500 of monitoring safety headwear 100 usage, in accordance with an embodiment of the disclosure. At block 504, a sensor 120 detects a status parameter 50 that indicates whether an object is located within a selected distance of the sensor 120. The object may be a person's head as described above. In an embodiment, the sensor 120 is a capacitance sensor. A status indicator 142 may be configured to activate when the status parameter indicates that an object is within a selected distance of the sensor 120.

At block 506, a transmission device 140 receives the status parameter 50 from the sensor 120. The transmission device 140 is in electronic communication with the sensor 120, as described above. The safety headwear 100 may include a headwear body 110 and the sensor 120 and the transmission device 140 may be operable attached to the headwear body 110. At block 508, the transmission device 140 transmits the status parameter 50 to an application 255 installed on a user device 200 in wireless communication with the transmission device 140. In an embodiment, the wireless communication may be Bluetooth as described above.

The method 500 may also comprise: transmitting, using the application 255 installed on the user device 200, the status parameter 50 to an application 255 installed on a manager device 300. The method 500 may further comprise: detecting, using the application 255 installed on the user device 200, a location parameter 57 of the user device 200; and transmitting, using the application 255 installed on the user device 200, the location parameter 57 of the user device 200 to an application 355 installed on a manager device 300. The application 255 on the user device 200 may be configured to transmit the status parameter 50 to an application 355 installed on a manager device 300 when the location parameter 57 is within a selected radius of a selected location, such as, for example, a job site. The application 255 on the user device 200 may be configured to detect a speed parameter 55 of the user device 200 when the location parameter 57 indicates that the user device 200 is en route to a selected location, such as, for example, a job site. The application 255 on the user device 200 is configured to transmit the status parameter 50 to an application 355 installed on a manager device 300 when the status parameter 50 indicates that an object is not within a selected distance of the sensor 120 and when the location parameter 57 is within a selected radius of a selected location.

The method 500 may yet further comprise: detecting, using the application 255 installed on the user device 200, a speed parameter 55 of the user device 200; and transmitting, using the application 255 installed on the user device 200, the speed parameter 55 of the user device 200 to an application 355 installed on a manager device 300. The application 255 on the user device 200 may be configured to transmit the speed parameter 55 to the application 355 installed on the manager device 300 when the speed parameter 55 is above a selected speed. The application 255 on the user device 200 may be configured to transmit the speed parameter 55 to the application 355 installed on the manager device 300 when the speed parameter 55 is above a selected speed and the location parameter 57 indicated that the user device 200 is en route to a selected location.

An alarm 359 may activate on the manager device 300 when at least one of the status parameter 50, speed parameter 55, and location parameter 57 is received. The alarm 359 may only activate when the status parameter 50 indicates that an object is not detected. Also, the alarm 359 may only activate when the location parameter 57 indicates that the user device 200 is within a selected radius of a select location or is en route to a selected location. Further, the alarm 359 may only activate if the speed parameter 55 is above a selected speed parameter.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A safety headwear monitoring system comprising:
a sensor configured to detect a status parameter, wherein the status parameter indicates whether a head of a person is located within a selected distance of the sensor;
a transmission device in electronic communication with the sensor and configured to receive the status parameter from the sensor; and
an application installed on a user device in wireless communication with the transmission device,
wherein the transmission device is configured to transmit the status parameter to the application,
wherein the application on the user device is configured to detect a location parameter of the user device, and
wherein the application on the user device is configured to detect a speed parameter of the user device when the location parameter indicates that the user device is en route to a selected location, and
wherein the application on the user device is configured to transmit the speed parameter to an application installed on a manager device when the speed parameter is above a selected speed and when the location parameter indicates that the user device is en route to the selected location.

2. The safety headwear monitoring system of claim 1, further comprising:
a headwear body, wherein the sensor and the transmission device are operably attached to the headwear body.

3. The safety headwear monitoring system of claim 1, further comprising:
a status indicator configured to activate when the status parameter indicates that an object is within a selected distance of the sensor.

4. The safety headwear monitoring system of claim 1, wherein:
the wireless communication is Bluetooth.

5. The safety headwear monitoring system of claim 1, wherein:
the sensor is a capacitance sensor.

6. The safety headwear monitoring system of claim 1, wherein:
the application on the user device is configured to transmit the status parameter to an application on a manager device.

7. The safety headwear monitoring system of claim 1, wherein:
the application on the user device is configured to transmit the status parameter to an application installed on a manager device when the location parameter is within a selected radius of a selected location.

8. The safety headwear monitoring system of claim 1, wherein:
the application on the user device is configured to transmit the status parameter to an application installed on a manager device when the status parameter indicates that an object is not within a selected distance of the sensor and when the location parameter is within a selected radius of a selected location.

9. The safety headwear monitoring system of claim 1, wherein:
the application on the user device is configured to transmit the speed parameter to an application installed on a manager device when the speed parameter is above a selected speed.

10. The safety headwear monitoring system of claim 9, further comprising:
a warning light in electronic communication with the transmission device, the warning light being located within a line of sight of a wearer of the safety headwear, wherein the warning light is configured to activate when a message is received from the manager device.

11. The safety headwear monitoring system of claim 1, wherein:
the application on the user device is configured to transmit the status parameter to an application installed on a manager device when the status parameter indicates that an object is not within a selected distance of the sensor and when the location parameter indicates that the user device is en route to a selected location.

12. The safety headwear monitoring system of claim 1, further comprising:
a warning light in electronic communication with the transmission device, the warning light being located within a line of sight of a wearer of the safety headwear, wherein the warning light is configured to activate when the speed parameter is above a selected speed.

13. A method of monitoring safety headwear usage, the method comprising:
detecting, using a sensor, a status parameter, wherein the status parameter indicates whether a head of a person is located within a selected distance of the sensor;
receiving, using a transmission device, the status parameter from the sensor, the transmission device being in electronic communication with the sensor;
transmitting, using the transmission device, the status parameter to an application installed on a user device in wireless communication with the transmission device;
detecting, using the application installed on the user device, a location parameter of the user device;
detecting, using the application installed on the user device, a speed parameter of the user device when the location parameter indicates that the user device is en route to a selected location; and
transmitting, using the application installed on the user device, the speed parameter to an application installed on a manager device when the speed parameter is above a selected speed and when the location parameter indicates that the user device is en route to the selected location.

14. The method of claim 13, further comprising:
transmitting, using the application installed on the user device, the status parameter to an application installed on a manager device.

15. The method of claim 13, further comprising: transmitting, using the application installed on the user device, the location parameter of the user device to an application installed on a manager device.

16. The method of claim 13, further comprising: transmitting, using the application installed on the user device, the speed parameter of the user device to an application installed on a manager device.

* * * * *